US011929907B2

(12) United States Patent
Trakinat et al.

(10) Patent No.: US 11,929,907 B2
(45) Date of Patent: Mar. 12, 2024

(54) ENDPOINT ASSISTED SELECTION OF ROUTING PATHS OVER MULTIPLE NETWORKS

(71) Applicant: T-Mobile USA, Inc., Bellevue, WA (US)

(72) Inventors: Jean Cheryl Trakinat, Ewa Beach, HI (US); Mark Younge, Golden, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 73 days.

(21) Appl. No.: 17/689,973

(22) Filed: Mar. 8, 2022

(65) Prior Publication Data
US 2023/0291677 A1 Sep. 14, 2023

(51) Int. Cl.
H04L 45/02 (2022.01)
G06Q 20/36 (2012.01)
G06Q 20/38 (2012.01)
H04L 45/24 (2022.01)
H04L 45/42 (2022.01)

(52) U.S. Cl.
CPC ......... H04L 45/02 (2013.01); G06Q 20/3674 (2013.01); G06Q 20/38215 (2013.01); H04L 45/24 (2013.01); H04L 45/42 (2013.01)

(58) Field of Classification Search
CPC ............. G06Q 20/3674; G06Q 20/38215
See application file for complete search history.

(56) References Cited

U.S. PATENT DOCUMENTS

| | | |
|---|---|---|
| 5,590,126 A | 12/1996 | Mishra et al. |
| 5,872,773 A | 2/1999 | Katzela et al. |
| 5,983,117 A | 11/1999 | Sandler et al. |
| 6,507,589 B1 | 1/2003 | Ramasubramani et al. |
| 6,954,435 B2 | 10/2005 | Billhartz et al. |
| 6,961,573 B1 | 11/2005 | Moon et al. |
| 7,007,102 B2 | 2/2006 | Billhartz et al. |
| 7,010,303 B2 | 3/2006 | Lewis et al. |
| 7,039,037 B2 | 5/2006 | Wang et al. |
| 7,061,896 B2 | 6/2006 | Jabbari et al. |
| 7,068,610 B2 | 6/2006 | Unruh |
| 7,123,906 B1 | 10/2006 | Otterbeck et al. |
| 7,142,866 B2 | 11/2006 | Windham et al. |
| 7,154,851 B1 | 12/2006 | Fedyk et al. |

(Continued)

FOREIGN PATENT DOCUMENTS

| | | |
|---|---|---|
| CA | 110831064 B | 11/2020 |
| CN | 102026203 B | 4/2013 |

(Continued)

Primary Examiner — Kristie D Shingles
(74) Attorney, Agent, or Firm — Perkins Coie LLP

(57) ABSTRACT

A wireless device can initiate a process to establish a communication link between the wireless device and an endpoint device. The wireless device can discover networks that are available for building the communication link and generate a list of multiple routing paths for the communication link that include different combinations of segments of the networks. The wireless device selects a particular routing path for the communication link and communicates a request to service providers of segments that would support the communication link. The service providers can grant the request such that the wireless device connects to the endpoint device over the communication link.

20 Claims, 5 Drawing Sheets

(56) References Cited

U.S. PATENT DOCUMENTS

| | | |
|---|---|---|
| 7,293,109 B2 | 11/2007 | Ott et al. |
| 7,333,803 B2 | 2/2008 | Benco et al. |
| 7,369,529 B2 | 5/2008 | Hsu et al. |
| 7,394,776 B2 | 7/2008 | Lee et al. |
| 7,426,195 B2 | 9/2008 | Mukherjee et al. |
| 7,464,179 B2 | 12/2008 | Hodges et al. |
| 7,620,010 B2 | 11/2009 | Takeda et al. |
| 7,680,096 B2 | 3/2010 | Jenkins et al. |
| 7,693,939 B2 | 4/2010 | Wu et al. |
| 7,729,263 B2 | 6/2010 | True et al. |
| 7,769,888 B2 | 8/2010 | Flammer et al. |
| 7,894,807 B1 | 2/2011 | Drennan |
| 7,941,149 B2 | 5/2011 | Wang et al. |
| 7,948,966 B2 | 5/2011 | Hughes et al. |
| 7,957,356 B2 | 6/2011 | Wang et al. |
| 7,961,740 B2 | 6/2011 | Flammer et al. |
| 7,995,501 B2 | 8/2011 | Jetcheva et al. |
| 8,072,951 B2 | 12/2011 | Flammer et al. |
| 8,111,619 B2 | 2/2012 | Liu et al. |
| 8,130,700 B2 | 3/2012 | Flammer et al. |
| 8,165,572 B1 | 4/2012 | Kirchhoff et al. |
| 8,260,546 B2 | 9/2012 | Soelberg |
| 8,279,870 B2 | 10/2012 | Flammer et al. |
| 8,300,614 B2 | 10/2012 | Ankaiah et al. |
| 8,346,225 B2 | 1/2013 | Raleigh |
| 8,422,428 B1 | 4/2013 | Hilyard et al. |
| 8,630,630 B2 | 1/2014 | Raleigh |
| 8,634,821 B2 | 1/2014 | Raleigh |
| 8,730,796 B2 | 5/2014 | Samuel et al. |
| 8,732,778 B1 | 5/2014 | Shen et al. |
| 8,738,690 B2 | 5/2014 | Dalela |
| 8,769,046 B2 | 7/2014 | Knapp et al. |
| 8,831,585 B2 | 9/2014 | Nicholson et al. |
| 8,843,158 B2 | 9/2014 | Nagaraj |
| 8,923,333 B2 | 12/2014 | Khan et al. |
| 9,167,437 B2 | 10/2015 | Wood et al. |
| 9,167,439 B2 | 10/2015 | Chowdhary et al. |
| 9,237,102 B2 | 1/2016 | Sewall et al. |
| 9,338,223 B2 | 5/2016 | Threefoot et al. |
| 9,338,714 B2 | 5/2016 | Thalanany et al. |
| 9,384,334 B2 | 7/2016 | Burba et al. |
| 9,392,641 B2 | 7/2016 | Morrill et al. |
| 9,485,707 B2 | 11/2016 | Kemmerer et al. |
| 9,537,868 B2 | 1/2017 | Manroa et al. |
| 9,596,613 B2 | 3/2017 | Tran et al. |
| 9,609,524 B2 | 3/2017 | Pulleti et al. |
| 9,806,997 B2 * | 10/2017 | Wohlert ............... H04L 45/302 |
| 10,009,820 B2 | 6/2018 | Bos |
| 10,091,658 B2 | 10/2018 | Zhang et al. |
| 10,098,051 B2 | 10/2018 | Mosko et al. |
| 10,193,795 B2 | 1/2019 | Abdallah et al. |
| 10,264,507 B2 | 4/2019 | Tan |
| 10,356,587 B2 | 7/2019 | Khanduri et al. |
| 10,362,532 B2 | 7/2019 | Wong et al. |
| 10,362,619 B2 | 7/2019 | Albasheir et al. |
| 10,476,619 B2 * | 11/2019 | Mahmood ............... H04L 12/28 |
| 10,484,273 B2 | 11/2019 | Menezes et al. |
| 10,484,925 B1 | 11/2019 | Chen et al. |
| 10,541,915 B2 | 1/2020 | Ryan et al. |
| 10,616,090 B2 | 4/2020 | Ross et al. |
| 10,687,228 B2 | 6/2020 | Gardner |
| 10,805,268 B2 | 10/2020 | Westberg et al. |
| 10,824,438 B2 | 11/2020 | Lu et al. |
| 10,841,205 B2 | 11/2020 | Kucera et al. |
| 10,992,729 B2 | 4/2021 | Hassan et al. |
| 11,023,878 B1 * | 6/2021 | Hernandez ......... G06Q 20/3224 |
| 11,166,211 B2 | 11/2021 | Caceres et al. |
| 11,223,970 B2 | 1/2022 | Cohn et al. |
| 2003/0028668 A1 | 2/2003 | Garcia-luna-aceves et al. |
| 2004/0073361 A1 | 4/2004 | Tzamaloukas et al. |
| 2004/0136324 A1 | 7/2004 | Steinberg et al. |
| 2005/0152305 A1 | 7/2005 | Ji et al. |
| 2006/0215577 A1 | 9/2006 | Guichard et al. |
| 2006/0221933 A1 | 10/2006 | Bauer et al. |
| 2007/0076673 A1 | 4/2007 | Joshi |
| 2007/0133775 A1 | 6/2007 | Winkler |
| 2008/0062961 A1 | 3/2008 | Nowlan |
| 2010/0197288 A1 | 8/2010 | Camilleri et al. |
| 2010/0302958 A1 * | 12/2010 | Wietfeldt ............... H04W 76/15 370/252 |
| 2012/0163171 A1 | 6/2012 | Lee et al. |
| 2012/0188949 A1 | 7/2012 | Salkintzis et al. |
| 2013/0123981 A1 | 5/2013 | Lee et al. |
| 2018/0213460 A1 | 7/2018 | Adella et al. |
| 2019/0149532 A1 | 5/2019 | Newberg et al. |
| 2020/0100175 A1 | 3/2020 | Cuevas Ramirez |
| 2021/0092667 A1 | 3/2021 | Zhu et al. |
| 2021/0227440 A1 | 7/2021 | Yeddala et al. |
| 2022/0060904 A1 | 2/2022 | Das et al. |

FOREIGN PATENT DOCUMENTS

| | | |
|---|---|---|
| CN | 102665297 B | 3/2015 |
| CN | 101854697 B | 7/2015 |
| CN | 102036335 B | 7/2015 |
| CN | 102970714 B | 1/2016 |
| CN | 104469727 B | 5/2016 |
| CN | 103826281 B | 3/2017 |
| CN | 104093187 B | 4/2017 |
| CN | 104080112 B | 11/2017 |
| CN | 108064064 A | 5/2018 |
| CN | 107277888 B | 6/2018 |
| CN | 104703242 B | 10/2018 |
| CN | 108834003 A | 11/2018 |
| CN | 108880894 A | 11/2018 |
| CN | 104394073 B | 4/2019 |
| CN | 110121201 A | 8/2019 |
| CN | 111542014 A | 8/2020 |
| CN | 109450524 B | 2/2021 |
| CN | 109560860 B | 2/2021 |
| CN | 110891294 B | 6/2021 |
| CN | 108696432 B | 7/2021 |
| CN | 109921993 B | 8/2021 |
| CN | 112291794 B | 8/2021 |
| CN | 113542115 A | 10/2021 |
| CN | 106211029 B | 11/2021 |
| CN | 113613306 A | 11/2021 |
| CN | 113923747 A | 1/2022 |
| DE | 112006000145 B4 | 1/2013 |
| DE | 102016211549 A1 | 12/2017 |
| DE | 102019107023 A1 | 10/2019 |
| DE | 112014000471 B4 | 6/2020 |
| EP | 1413154 A1 | 4/2004 |
| EP | 1708446 B1 | 6/2008 |
| EP | 1502459 B1 | 6/2011 |
| EP | 2366261 A1 | 9/2011 |
| EP | 2891341 A1 | 7/2015 |
| EP | 3149885 A1 | 4/2017 |
| EP | 3210425 A1 | 8/2017 |
| JP | 3946652 B2 | 4/2007 |
| JP | 2007243803 A | 9/2007 |
| JP | 4357321 B2 | 8/2009 |
| JP | 2010074504 A | 4/2010 |
| JP | 5905771 B2 | 3/2016 |
| JP | 6102461 B2 | 3/2017 |
| JP | 6130772 B2 | 4/2017 |
| JP | 2018074579 A | 5/2018 |
| JP | 2019176385 A | 10/2019 |
| JP | 2021057738 A | 4/2021 |
| KR | 100231714 B1 | 1/2000 |
| KR | 20040011634 A | 2/2004 |
| KR | 100519627 B1 | 10/2005 |
| KR | 100695235 B1 | 3/2007 |
| KR | 100765703 B1 | 10/2007 |
| KR | 20110097516 A | 8/2011 |
| KR | 101460946 B1 | 11/2014 |
| KR | 20160041631 A | 4/2016 |
| KR | 101919941 B1 | 11/2018 |
| WO | 9810541 A1 | 3/1998 |
| WO | 0156251 A2 | 8/2001 |
| WO | 2009015436 A1 | 2/2009 |
| WO | 2009128471 A1 | 10/2009 |
| WO | 2012164674 A1 | 12/2012 |
| WO | 2016050993 A1 | 4/2016 |

(56) References Cited

FOREIGN PATENT DOCUMENTS

| WO | 2017222449 A1 | 12/2017 |
|----|---------------|---------|
| WO | 2018062286 A1 | 4/2018  |
| WO | 2019119346 A1 | 6/2019  |
| WO | 2021160676 A1 | 8/2021  |
| WO | 2021205057 A1 | 10/2021 |
| WO | 2021209801 A1 | 10/2021 |
| WO | 2022005346 A1 | 1/2022  |

* cited by examiner

ENDPOINT ASSISTED SELECTION OF ROUTING PATHS OVER MULTIPLE NETWORKS

BACKGROUND

In order for a communication to travel from a sender to an intended recipient, it must route through a series of interconnected networks. Routing refers to the process of forwarding communications from an originating source to a desired endpoint. Path selection involves applying a routing metric to multiple routes to select (or predict) the best route. Routing is performed in many types of networks, including circuit-switched networks, such as the public switched telephone network (PSTN), and computer networks, such as the internet. In telecommunications, routing and path selection involve agreements that are typically formed between operator networks to ensure service and roaming continuity. For example, agreements between the operators set policies to control network access for roaming subscribers and manage shared services. Roaming agreements can stipulate authentication, authorization, and billing for visiting subscribers, and minimal safety standards. Thus, routing and path selection is controlled on the network side.

Optimizing the route that a communication takes to reach the recipient ensures better call quality, stronger connections, and fewer dropped calls. The routing process usually directs forwarding based on routing tables. Routing tables maintain a record of the routes to various network destinations. Routing tables may be specified by an administrator, learned by observing network traffic or built with the assistance of routing protocols. Routing schemes and protocols differ in how they deliver messages. Examples of routing schemes include unicast, broadcast, multicast, and anycast. Examples of routing protocols include link-state, optimized link state, and path-vector routing protocols. The metric that is used for path selection is computed by a routing algorithm, and can cover information such as bandwidth, network delay, hop count, path cost, load, maximum transmission unit, reliability, and communication cost. The routing table can store only the best possible routes, while link-state or topological databases may store all other information as well.

BRIEF DESCRIPTION OF THE DRAWINGS

Detailed descriptions of implementations of the present invention will be described and explained through the use of the accompanying drawings.

Figure 1:
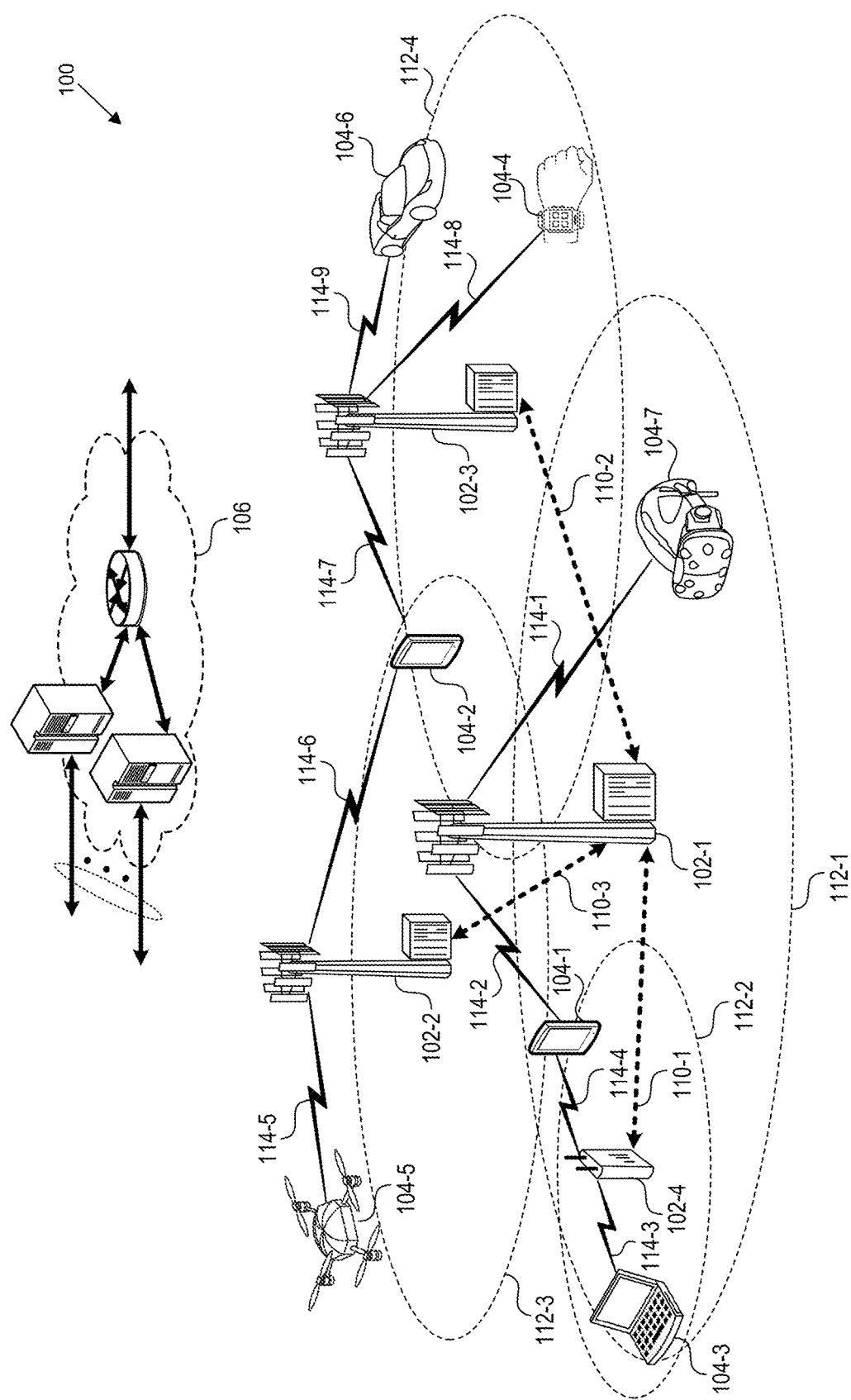
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a technique for building multiple routing paths (e.g., connection paths) over networks and selecting a routing path to route communications between endpoint devices. One endpoint device is a wireless device that assists in identifying and connecting segments of a routing path over networks to the other endpoint device. In one example, the wireless device uses discovery techniques and selection algorithms to assist in access and connectivity routing over the networks by negotiating with their service providers. A standard protocol can define the process for endpoint assisted selection of routing paths. As such, service providers can adopt the protocol to participate in the endpoint assisted selection of routing paths. A service provider can participate in the endpoint assisted selection of routing paths by advertising information that can be used by the wireless device to calculate routing paths. For example, an advertisement or notification message can include connectivity information, available service types, performance characteristics, and costs. Examples of the service types include transport, routing, processing, priority, and security services.

The wireless device can piece together network segments for routing paths over multiple networks between endpoint devices. In other words, a routing path can include two wireless endpoint devices connected over multiple segments of multiple networks, which could be operated by multiple service providers. For example, a first access network can include a mesh network that has several internet access nodes. Upon attaching to the first access network, the wireless device can successively decide which network nodes to use to reach the radio access network or wired network that serves the endpoint device.

In an implementation, a first wireless device scans for available networks to reach the second wireless device (a desired endpoint). The discovered networks can provide information regarding service options, performance, or costs (e.g., quality, cost per minute, cost per byte of data). The wireless device executes a configurable algorithm to compute (e.g., analyze) costs for utilizing different networks or service providers and then displays a set of options (e.g., cost, speed, security) for endpoint assisted selection of routing paths on the first wireless device. The user selects an option of the set of options to route communications. Upon selecting the option, a payment is automatically made to the one or more service providers of the selected option. In one example, payment is made with cryptocurrency (e.g., an irrevocable payment). The amount of cryptocurrency can be automatically deducted from an account or submitted from the user's digital wallet. The first wireless device can make payments when the communication link and/or when the link terminates, to account for actual utilization.

A user profile for configuring a routing path can be stored at the originating wireless device. That is, the profile can include user preferences to automatically configure the routing path based on the user's profile. The path can be configured to auto-select networks and segments for the routing path based on the user profile. For example, the wireless device could estimate cost hop-by-hop or by preferred profiles/vendors. The user profile may include a default setting to optimize for using a combination of networks that are least cost-prohibitive or that provides a quality of service greater than a threshold minimum amount. In another example, the profile includes a setting to prioritize certain networks or service providers over others. As such, the wireless device can scan for networks and automatically configure a routing path to another endpoint device based on the user profile, without requiring input from the user to customize the routing path.

Upon selection of the routing path, the wireless device registers with the one or more providers of the networks for the service to support the communication path. The wireless device can also dynamically repeat the discovery and analysis to dynamically reconfigure the routing path. That is, the wireless device can cause the routing path to swap segments or use different networks to connect to the endpoint device. The wireless device can perform discovery and analysis periodically or in response to a measure of the current routing path. For example, the wireless device can detect a diminished signal strength along the current routing path and, in response, perform a discovery and analysis procedure to reconfigure the routing path to provide improved signal strength.

In one implementation, a user or associated wireless device can leverage a device identifier or a cryptocurrency account to authenticate the user without requiring separate account information to self-configure the network path. That is, the user does not have to pre-establish an account to participate in the self-configuring procedure because existing data of the device or cryptocurrency account can be used to authenticate the user as a legitimate participant or a bad actor. As a result, the technology can eliminate the need for network subscriber accounts because dedicated subscribers are unnecessary to build communication links. Moreover, the technology eliminates the need for preexisting roaming agreements, roaming processing, and can even remove the need for a home account so long as a user can attach to a detected network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
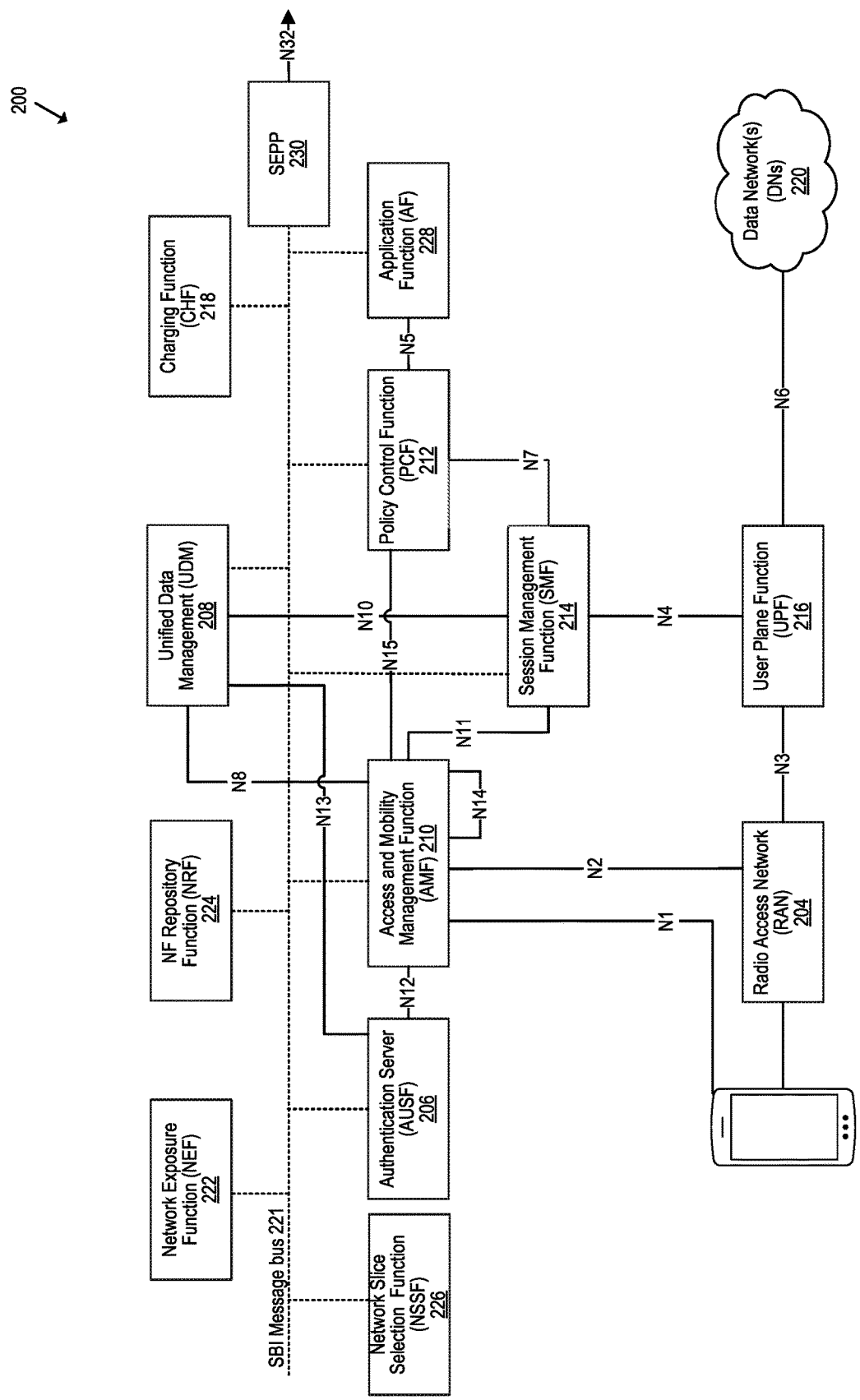
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

A Security Edge Protection Proxy (SEPP) 230 is part of a roaming security architecture. For example, an N32 interface interconnects SEPPs of a visited public land mobile network (PLMN) and a home public land mobile network (HPLMN) in roaming scenarios. All signaling traffic can transmit between the operator networks through the interconnect. The N32 interface between the SEPPs provides protection of sensitive data attributes while allowing mediation services through the interconnect.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Endpoint Assisted Routing Path Selection

In telecommunications, an intermediary can have a role in establishing a communication link across multiple networks. For example, roaming offers the ability for a subscriber to automatically make and receive communications (e.g., voice, data) or access other services, including home data services, when travelling outside the geographical coverage area of a home network, by means of using a visited network. For two mobile operators, roaming devices can be classified as inbound or outbound. An inbound roaming service allows subscribers from an operator to access a local network and services of another operator. An outbound roaming service allows subscribers from an operator's local network to access the other operator's network and services.

To ensure service continuity; agreements are typically formed between operator networks. For example, agreements between operators can set policies to control network access for roaming subscribers and manage shared services, and a clearinghouse processes roaming payments. The agreements can stipulate authentication, authorization, and billing for visiting subscribers, and safety standards. The operators can connect to each other directly or through an intermediary service provider. A direct interconnection is through public networks or facilitated through private lines, for example. In one example, an intermediary establishes roaming networks through which different operator networks connect. Thus, users at endpoints of a communication link cannot choose which combination of networks are used to build a routing path to each other.

The disclosed technology enables a user at an endpoint of a communication link to actively control or manage selection of a routing path from a wireless device to another endpoint device (e.g., another wireless device). The wireless device can negotiate agreements on-the-fly to select the routing path without an intermediary and/or preexisting agreements between network operators. Moreover, the user of the wireless device can pay for services to support the communication link with cryptocurrencies, which allows more control over payments and can facilitate authentication while keeping the user's identity private (e.g., anonymizing user information).

Figure 3:
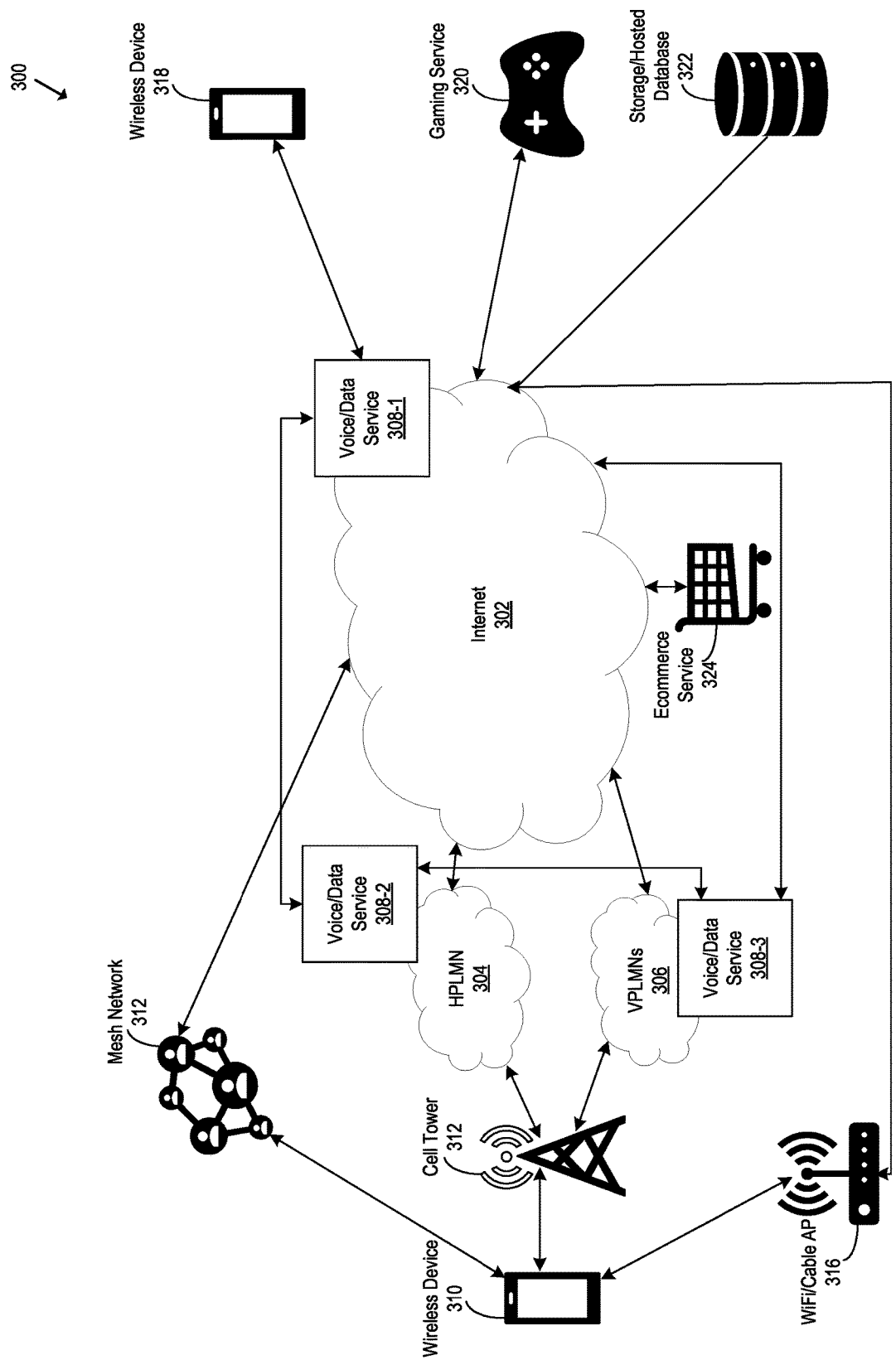
FIG. 3 is a system diagram that illustrates networks through which a wireless device can connect with another endpoint device by selecting from among multiple routing paths.

FIG. 3 is a system diagram that illustrates networks through which a wireless device can connect with another endpoint device by selecting from among multiple routing paths. The system 300 shows different network types that are interconnected. Examples include the internet 302, including combinations of networks. A home public land mobile network (HPLMN) 304 identifies a public land mobile network (PLMN) in which subscriber profiles are held. A PLMN is a geographical area covered by a mobile network operator for voice and data services to a mobile subscriber. For example, an operator may have one PLMN in the whole city. PLMNs belong to the same or different operators. A PLMN connects to other PLMNs for roaming, messaging, and data services. In roaming, a subscriber attaches to the core network via the access network. Users roaming to other networks receive subscription information from the HPLMN 304. Based on the location, the PLMN can be a HPLMN or visited PLMN (VPLMN). The roaming core network belongs to the VPLMN 306. Signaling traffic can transmit through an interconnect (not shown) between the HPLMN 304 and VPLMN 306 to provide protection of sensitive data attributes while allowing mediation services through the interconnect. A VPLMN and HPLMN can be the same or different, depending upon the location of the wireless device and the network operator. A network operator has VPLMN based changing and roaming policies. Each of the internet 302, HPLMN 304, and VPLMN 306 are interconnected to provide roaming voice or data services depicted respectively as 308-1, 308-2, and 308-3.

The wireless device 310 can connect to the HPLMN 304 or VPLMN 306 of a telecommunications network through a radio access node (e.g., cell tower 312) of a radio access network. The wireless device 319 can also connect to the internet 302 through a mesh network 314 that provides a WiFi connection or a broadband access point (AP) such as a WiFi/cable AP 316. Another wireless device 318 is an example of an endpoint device that can connect to the wireless device 310 over segments of a combination of networks. The system 300 also illustrates examples of services that can be accessed to the wireless device 310 on a cost per unit basis (e.g., per data size), cost per service, or service bundle basis. As shown, the services include a gaming service 320, storage or hosted database service 322, and an e-commerce service 324. Although illustrated to include wireless devices 310 and 318, the system 300 can additionally or alternatively include wireline voice devices (e.g., laptop, Plain Old Telephone Service (POTS) telephone).

Figure 4:
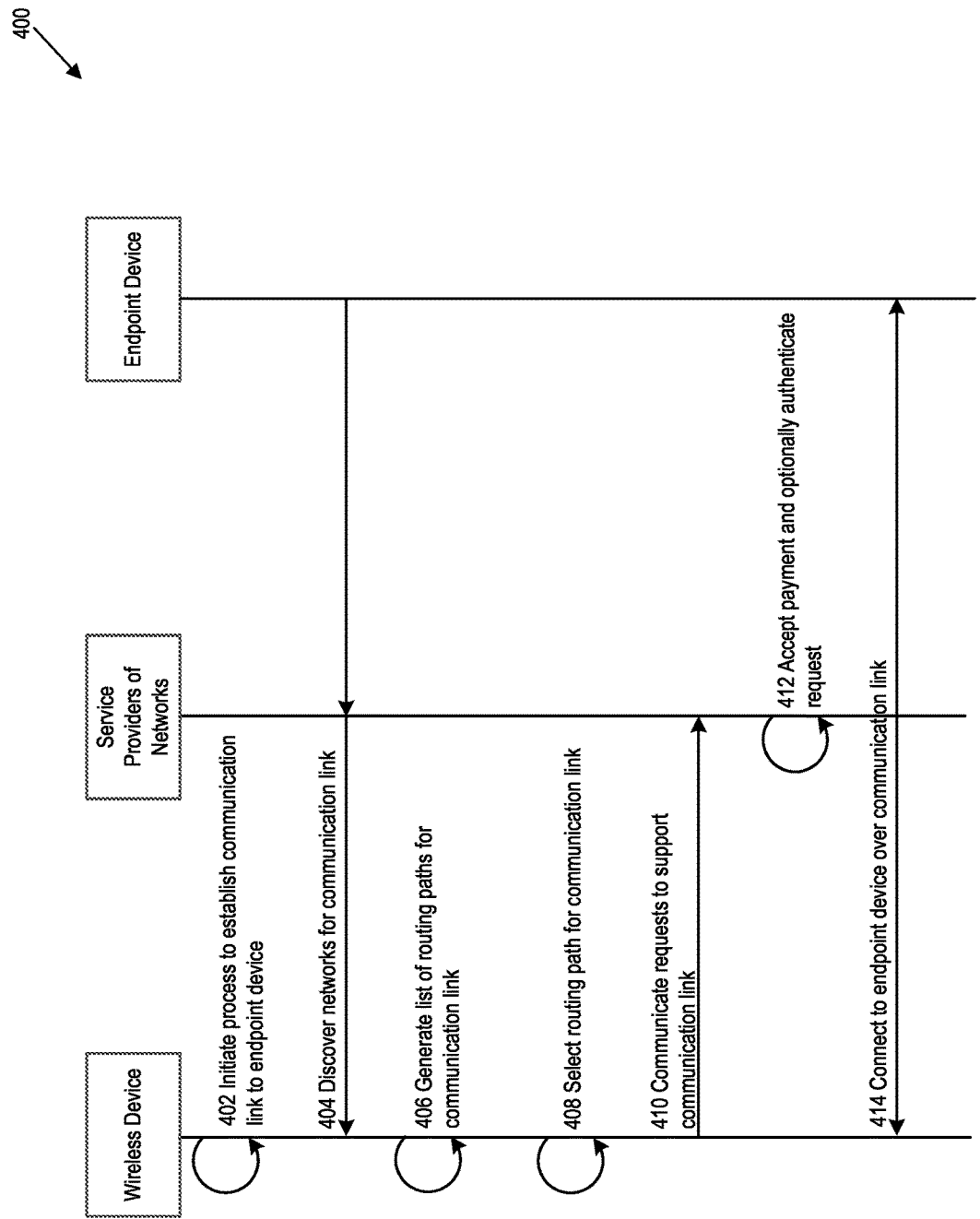
FIG. 4 is a flowchart that illustrates a process assisted by a wireless device to establish a communication link between the wireless device and an endpoint device.

FIG. 4 is a flowchart that illustrates a process assisted by a wireless device to establish a communication link between the wireless device and an endpoint device. In one example, the disclosed technology is enabled by a verifiable and irrevocable payment system (e.g., cryptocurrency), machine intelligence (e.g., machine learning (ML), artificial intelligence (AI)) to navigate through and identify optimal routing paths, and/or a standard protocol adopted by service providers of networks to participate in endpoint assisted routing path selection.

At 402, the wireless device can initiate a process to establish a communication link between the wireless device and an endpoint device. The process to initiate the communication link can include any conventional mechanism such as inputting a phone number to make a voice call or opening a web browser to search the internet. These mechanisms can trigger the wireless device to start the endpoint assisted selection of routing paths. The wireless device can provide an alternative option to invoke the process for endpoint assisted selection of routing paths for a particular communication link. For example, the wireless device can have an application or agent which, when opened, enables endpoint assisted selection of routing paths.

At 404, the wireless device can discover multiple networks that are available for building the communication link between the wireless device and the endpoint device. For example, the wireless device can attach to a local network to scan for successively linked networks that reach the endpoint device. In one example, the wireless device can scan for unsolicited messages provided by (e.g., broadcast) service providers of networks. At least some of the unsolicited messages are aggregated and delivered to the wireless device through a local network. The unsolicited messages can indicate the service types and performance characteristics of the multiple networks and/or routes. In another example, the wireless device can query the service providers for availability to support the communication link. The wireless device receives from the multiple service providers, in response, an indication of the different service types and performance characteristics of the networks. Thus, the local network can aggregate information from other networks that support the protocol for endpoint assisted selection of routing paths.

The local network can thus provide the information including the service types and performance characteristics to the wireless device. The wireless device can store at least a portion of that information. For example, the local network can identify a series of networks available to reach the endpoint device, and the wireless device can store performance characteristics that map to the series of networks. Examples of the service types include a communication transport, routing, processing, priority, or security features. Examples of the performance characteristics include a communications quality, speed, cost per unit time, or cost per data unit (e.g., byte).

At 406, the wireless device can generate a list of routing paths for the communication link that each include a different combination of segments of networks. As such, the routing paths are configured based on different combinations of segments, networks, and service providers. In one example, each routing path is optimized for a metric. As such, the wireless device can generate routing paths that are optimized for a cost metric, a performance metric, and/or other metrics.

The wireless device can include or access a ML model or other AI technology to find optimal routing paths for the communication link. As such, rather than presenting all routing paths to the endpoint device, the ML model can filter and sort routing paths that are optimal for the user or for the communication link. The ML model or outputs thereof can be stored at the wireless device to aid in generating a list of optimal routing paths (as opposed to any or all routing paths). The inputs to the ML model can include user inputs, network inputs, and/or past performance as inputs. The user inputs can include preferences such as preferred service providers, number of hops, network types, etc. The network inputs can include performance data of the networks such as congestion or bandwidth data collected by the wireless device. The past performance data can include whether certain networks supported their advertised performance values when used in past routing paths. The ML model can be trained based on these inputs to output predictions including routing paths that are intelligently tailored for the user and/or the current location of the wireless device.

At 408, the wireless device receives an input indicating selection of a particular routing path for the communication link, which includes a particular combination of segments of the networks. The routing path is associated with service providers for the respective combination of segments. The routing path can be manually or automatically selected at the wireless device based on user preferences that are stored in a user profile at the wireless device. For example, the wireless device can receive an indication of a selection of the routing path from among the multiple routing paths displayed as graphical icons to the user on a touch-sensitive display of the wireless device. The wireless device can also autonomously select the routing path from among the multiple routing paths based on the preference of the user stored in a memory device of the wireless device in association with the user profile. Examples of preferences include a preferred service provider, a preferred number of segments, a preferred total cost or cost per unit, a preferred network or network type, a preferred total performance or performance per unit, and/or a preferred type of service (processing, priority, security service, etc.).

Once the ML model is sufficiently trained, the ML model can automatically select a routing path. As such, the routing path that is selected is based on a customization for past user behavior/preferences and the location of the wireless device. Thus, the wireless device can autonomously select the routing path from among the multiple routing paths based on the ML model in association with a user profile. The ML model can reduce the number of routing paths that are presented to the user for selection. For example, the ML model can filter and sort available routing paths and automatically select a routing path that is optimized for one or more metrics preferred by the user, as indicated by past inputs and performance. In another example, the machine learning model can improve security to identify honeypots or learn about the quality of a communication link, such that networks that provide low quality connects are at least temporarily precluded from future proposed routing paths.

At 410, the wireless device can communicate a request to each service provider of the routing path to support the communication link. The communication link can be established once the service providers grant the request. In one example, the process does not require authenticating the user. For example, authentication is usually required as recourse so that a user that acts fraudulently to use the networks without paying can be stopped from doing so in the future or payment can be obtained a different way. However, the disclosed technology can dispense with needing authentication information when a verifiable and irrevocable payment is made. For example, the user can pay the service providers with cryptocurrency, which can be validated on the blockchain and is a form of irrevocable payment. Hence, the payment itself provides a form of authentication while keeping other user information anonymized. For example, the request can include payment information that also functions as anonymized information to pay and authenticate the user to the service providers. The payment information can include an amount of cryptocurrency and an address for a digital wallet from which the cryptocurrency is paid.

In one example, a message separate from the request is sent to each service provider and includes information to obtain cryptocurrency from a digital wallet, and where the information anonymizes the user while verifying the user based on the digital wallet. In another example, the request to each service provider can include an identifier of the wireless device (e.g., MAC address, Subscription Permanent Identifier (SUPI)), where the identifier of the wireless device is used to authenticate the transaction.

At 412, the service providers obtain payment to support the communication link and can optionally authenticate the request based on anonymized information. If successful, the service providers provision resources for the segments that support the routing path of the communication link. In one example, the service providers are automatically paid using cryptocurrency, as irrevocable payments. The request can be granted with authentication of anonymized information, where the anonymized information is related to a cryptocurrency payment to the combination of service providers or as an identifier of the wireless device. The disclosed technology is compatible with other technologies. For example, if an existing subscriber account is used, an existing authentication procedure can be used. In one example, a revocable payment system (e.g., credit cards, user account) can be implemented; however, such systems would benefit from additional authentication mechanisms to provide recourse to the service provider in the event of fraud or other malicious payments.

At 414, the wireless device can connect to the endpoint device over the communication link in response to the combination of service providers granting the request. The wireless device can cause the communication link to be built successively (e.g., in series, one at a time) by connecting the combination of segments in series from the wireless device to the endpoint device. In one example, the wireless device registers with each of the combination of service providers successively as the routing path is being built toward the endpoint device.

After establishing the communication link, the wireless device can periodically scan networks to discover new routing paths from a current location of the wireless device to the endpoint device. As such, the communication link can be periodically updated to ensure that the user is experiencing a communication link that remains optimized for the user's preferences. The communication link is updated based on a new routing path to include a new segment, a new network, or a new service provider. In another example, the wireless device is triggered to scan networks in response to a detected change in the networks of the routing path. For example, the wireless device can detect diminished performance of the communication link and, in response, scan the networks to discover new routing paths from a current location to the endpoint device. The routing path can be updated with a new segment, network, or service provider to mitigate the diminished performance and provide service continuity.

The technology can alternatively be implemented as a centralized service that coordinates building communication links based on segments of networks for optimized routing paths. For example, a third-party service can collect data regarding the access, availability, cost, performance, and other data that is used to build proposed routing paths. A user can subscribe to the third-party service as an independent service or in addition to a subscription to a primary network operator. The third-party service can collect relevant information from networks and endpoint devices, including payments for service and resources of networks for supporting a communication link. The third-party service can manage payments by collecting a total payment for a routing path, keep a portion as a fee for the service, and distribute the remaining portion to the service providers that support the communication link.

The disclosed technology can also be implemented as an add-on service for dedicated subscribers to a primary network operator. For example, the dedicated subscribers can pay for the additional service to provide network independent routing path optimization. Alternatively, the network operator can support both dedicated subscribers and non-dedicated subscribers that can utilize the network or parts of the network to support custom routing paths for optimized communication links. As such, the network operator can increase its user base with additional non-dedicated users.

Computer System

Figure 5:
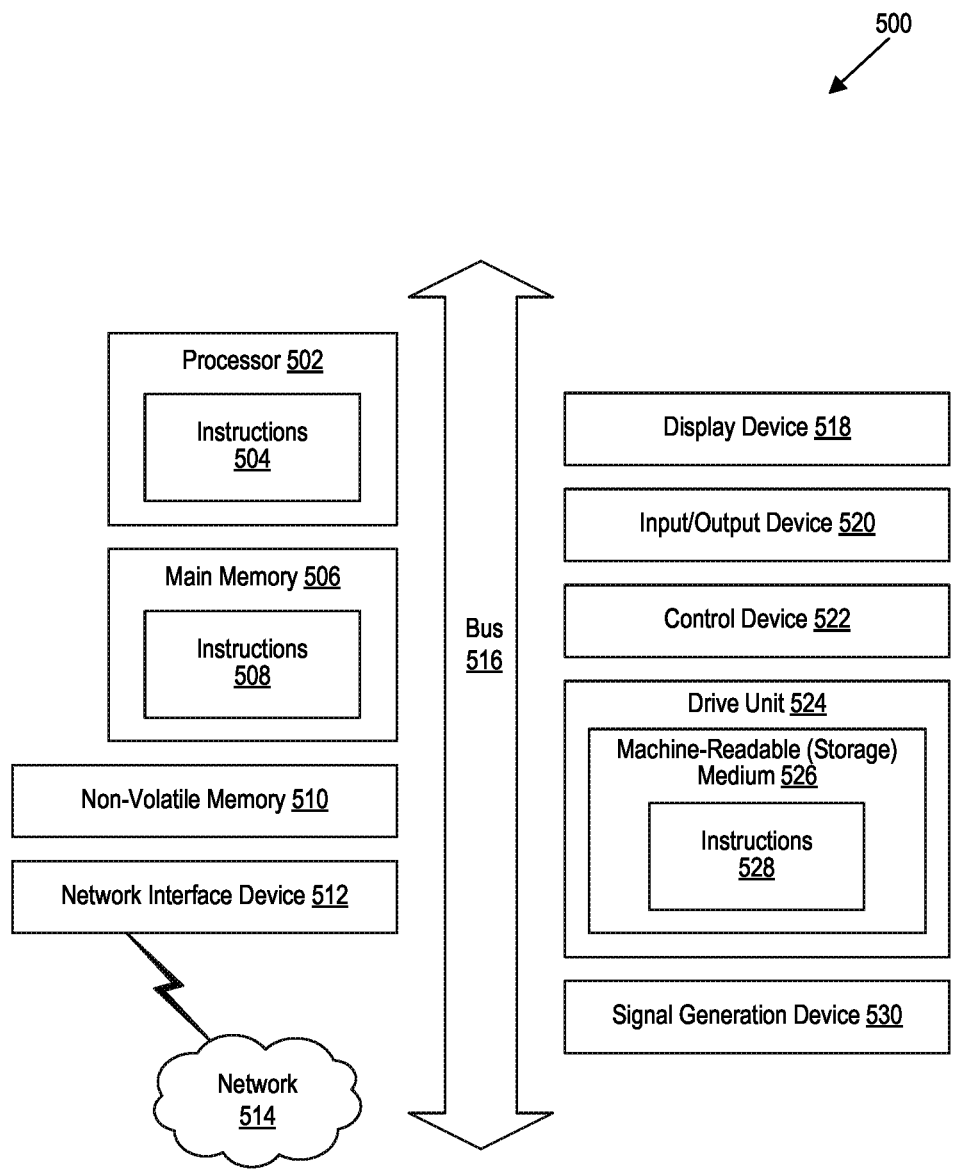
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A wireless device comprising:
    at least one hardware processor; and
    at least one non-transitory memory storing instructions, which, when executed by the at least one hardware processor, cause the wireless device to:
        initiate a process to establish a communication link between the wireless device and an endpoint device;
        discover multiple networks that are available for building the communication link between the wireless device and the endpoint device,
            wherein the multiple networks are associated with service types and performance characteristics;
        generate a list of multiple routing paths for the communication link that each include a different combination of segments of the multiple networks, wherein each of the multiple routing paths is optimized for a metric;
        select a particular routing path of the multiple routing paths for the communication link including a particular combination of segments,
            wherein the particular routing path is selected at the wireless device based on a preference of a user as indicated at the wireless device, and
            wherein the particular routing path is associated with multiple service providers for the particular combination of segments;
        negotiate on-the-fly with the multiple service providers, wherein the negotiating includes communicating a request to each of the multiple service providers associated with the particular combination of segments to support the communication link,
            wherein granting the request requires an irrevocable payment to the multiple service providers to support the particular combination of segments of the communication link; and
        connect to the endpoint device over the communication link in response to granting the request by the multiple service providers.

2. The wireless device of claim 1, wherein to discover multiple networks for building the communication link comprises causing the wireless device to:
    scan for unsolicited messages broadcast by the multiple service providers,
        wherein a group of the unsolicited messages are aggregated and delivered to the wireless device through one of the multiple networks,
        wherein the unsolicited messages indicate the service types and the performance characteristics of the multiple networks,
        wherein the service types include a communication transport, routing, processing, priority, or security, and
        wherein the performance characteristics include a communications quality, speed, cost per unit time, or cost per data unit.

3. The wireless device of claim 1, wherein to discover multiple networks for building the communication link comprises causing the wireless device to:
    query one or more of the multiple service providers for availability to support the communication link; and
    receive a response from the multiple service providers including an indication of the service types and the performance characteristics of the multiple networks,
        wherein the service types include a communication transport, routing, processing, priority, or security, and
        wherein the performance characteristics include a communications quality, speed, cost per unit time, or cost per unit data size.

4. The wireless device of claim 1, wherein to generate a list of the multiple routing paths for the communication link comprises causing the wireless device to:
    generate a first proposed routing path that is optimized for a cost metric; and
    generate a second proposed routing path that is optimized for a performance metric.

5. The wireless device of claim 1, wherein to select the particular routing path comprises causing the wireless device to:
    receive an indication of the preference of the user based on a selection of an indication of the particular routing path from among indications of the multiple routing paths displayed to the user on the wireless device.

6. The wireless device of claim 1, wherein to select the particular routing path comprises causing the wireless device to:
    autonomously select the particular routing path from among the multiple routing paths at the wireless device based on a machine learning model in association with a user profile,
        wherein the machine learning model generates the multiple routing paths as predictions of optimal routing paths based on inputs including prior user selections of routing paths, prior performance of selected routing paths, or network performance data collected by the wireless device.

7. The wireless device of claim 1, wherein the multiple routing paths are configured based on different combinations of segments, networks, and service providers.

8. The wireless device of claim 1, wherein the request to each service provider includes access to obtain cryptocurrency from a digital wallet, and wherein authentication information that anonymizes the user is based on the digital wallet or the cryptocurrency.

9. The wireless device of claim 1, wherein the request to each service provider includes an identifier of the wireless device, and wherein authentication information that anonymizes the user is based on the identifier of the wireless device.

10. The wireless device of claim 1, wherein to connect to the endpoint device over the communication link comprises causing the wireless device to:
cause the communication link to be built by successively connecting the particular combination of segments from the wireless device to the endpoint device.

11. The wireless device of claim 1, wherein the preference of the user includes:
a preferred service provider,
a preferred number of segments,
a preferred total cost or cost per unit,
a preferred network or network type,
a preferred total performance or performance per unit, or
a preferred type of service.

12. The wireless device of claim 1 further caused to, prior to the wireless device connecting to the endpoint device:
in response to selection of the particular routing path, automatically pay the multiple service providers using cryptocurrency associated with the user.

13. The wireless device of claim 1, wherein connecting to the endpoint device comprises causing the wireless device to:
register with each of the multiple service providers of the particular routing path.

14. The wireless device of claim 1 further caused to:
periodically scan the multiple networks to discover new routing paths from a current location of the wireless device to the endpoint device,
wherein the multiple networks are scanned after the communication link has been initially established; and
update the communication link based on a particular new routing path to include a new segment, a new network, or a new service provider.

15. The wireless device of claim 1 further caused to:
detect diminished performance of the communication link;
in response to the detected diminished performance, scan the multiple networks to discover new routing paths from a current location of the wireless device to the endpoint device; and
update the communication link based on a particular new routing path to include a new segment, a new network, or a new service provider.

16. A computer-readable storage medium, excluding transitory signals and carrying instructions, which, when executed by at least one data processor of a wireless device, cause the wireless device to:
initiate a communication link between the wireless device and an endpoint device;
in response to the communication link being initiated, scan for multiple service providers to discover information of multiple networks that are accessible and available to support the communication link;
generate a list of multiple routing paths for the communication link based on the discovered information of the multiple networks;
select a particular routing path from among the multiple routing paths for the communication link,
wherein the particular routing path is associated with multiple service providers;
negotiate on-the-fly with the multiple service providers,
wherein the negotiating includes communicating a request to each of the multiple service providers of the particular routing path to support the communication link; and
connect to the endpoint device over the communication link established through successive connections of the particular routing path from the wireless device to the endpoint device.

17. The computer-readable storage medium of claim 16, wherein granting the request requires authentication of anonymized information, and wherein the anonymized information is related to a cryptocurrency payment to the multiple of service providers.

18. The computer-readable storage medium of claim 16, wherein to select the particular routing path comprises causing the wireless device to:
autonomously select the particular routing path based on a preference of a user of the wireless device indicated in a profile stored at the wireless device.

19. A computer-readable storage medium, excluding transitory signals and carrying instructions, which, when executed by at least one data processor of a system of a service provider, cause the system to:
broadcast unsolicited messages indicating a service type and a performance characteristic of a network available to support a communication link between two wireless devices,
wherein the service type includes a communication transport, routing, processing, priority, or security, and
wherein the performance characteristic includes a communications quality, speed, cost per unit time, or cost per unit byte;
negotiate on-the-fly with a wireless device,
wherein the negotiating includes receiving a request from the wireless device of the two wireless devices to support a segment of a routing path for the communication link,
wherein the segment includes the network supported by the service provider,
wherein other segments of the routing path are included in other networks supported by other service providers, and
wherein the request includes anonymized information and authorizes payment to the service provider to support the routing path;
obtain payment to support the routing path and authenticate the request based on the anonymized information; and
in response to the payment and authentication of the request, provision the segment to support the routing path of the communication link.

20. The computer-readable storage medium of claim 19, wherein the anonymized information authorizes payment to the service provider to obtain cryptocurrency from a digital wallet associated with the request to support the segment of the routing path for the communication link.

* * * * *